(12) United States Patent
Ivakitch et al.

(10) Patent No.: US 10,443,446 B2
(45) Date of Patent: *Oct. 15, 2019

(54) STEEL SOFT WALL FAN CASE

(71) Applicant: PRATT & WHITNEY CANADA CORP., Longueuil (CA)

(72) Inventors: Richard Ivakitch, Mississauga (CA); Czeslaw Wojtyczka, Brampton (CA); Andreas Eleftheriou, Woodbridge (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 50 days.

This patent is subject to a terminal disclaimer.

(21) Appl. No.: 15/908,210

(22) Filed: Feb. 28, 2018

(65) Prior Publication Data
US 2018/0187570 A1 Jul. 5, 2018

Related U.S. Application Data

(63) Continuation of application No. 14/711,854, filed on May 14, 2015, now Pat. No. 9,945,254.

(51) Int. Cl.
| F01D 25/24 | (2006.01) |
| F01D 25/00 | (2006.01) |
| F01D 11/12 | (2006.01) |
| F01D 11/14 | (2006.01) |
| F01D 21/04 | (2006.01) |
| F02C 7/045 | (2006.01) |
| F04D 29/52 | (2006.01) |
| F04D 29/02 | (2006.01) |

(52) U.S. Cl.
CPC ............ *F01D 25/24* (2013.01); *F01D 11/122* (2013.01); *F01D 11/14* (2013.01); *F01D 21/045* (2013.01); *F01D 25/005* (2013.01); *F02C 7/045* (2013.01); *F04D 29/023* (2013.01); *F04D 29/526* (2013.01); *F05D 2220/36* (2013.01); *F05D 2300/121* (2013.01); *F05D 2300/171* (2013.01)

(58) Field of Classification Search
CPC ...... F01D 11/122; F01D 21/045; F01D 25/24; F01D 25/005; F01D 29/526; F04D 29/526
USPC ............................................................ 415/9
See application file for complete search history.

(56) References Cited

U.S. PATENT DOCUMENTS

| 4,534,698 A | * | 8/1985 | Tomich ................. F01D 21/045 415/121.2 |
| 6,619,913 B2 | | 9/2003 | Czachor et al. |
| 6,769,864 B2 | | 8/2004 | Sathianathan et al. |

(Continued)

FOREIGN PATENT DOCUMENTS

| EP | 2388441 | 11/2011 |
| GB | 2112349 | 7/1983 |

*Primary Examiner* — Woody A Lee, Jr.
(74) *Attorney, Agent, or Firm* — Norton Rose Fulbright Canada L.L.P.

(57) ABSTRACT

A steel soft wall fan case assembly according to one embodiment configured with a thin-walled steel support structure shell including a plurality of annular axial walls of thin sheet metal reinforced by a plurality of rings interconnecting axially adjacent annular axial walls. The steel support structure shell is structurally integrated with honeycomb materials and an annular metallic inner wall. A fabric containment layer may be wrapped around one of the annular axial walls of the steel support structure shell.

19 Claims, 2 Drawing Sheets

(56) References Cited

U.S. PATENT DOCUMENTS

| | | | |
|---|---|---|---|
| 6,814,541 B2 * | 11/2004 | Evans | B29C 33/40 |
| | | | 415/200 |
| 7,503,164 B2 * | 3/2009 | McMillan | F01D 21/045 |
| | | | 181/213 |
| 8,202,041 B2 * | 6/2012 | Wojtyczka | F04D 29/023 |
| | | | 415/119 |
| 8,500,390 B2 | 8/2013 | Wojtyczka et al. | |
| 8,757,958 B2 | 6/2014 | Lussier | |
| 8,827,629 B2 * | 9/2014 | Voleti | F01D 21/04 |
| | | | 415/1 |
| 9,248,612 B2 | 2/2016 | Zhu et al. | |
| 9,429,039 B2 | 8/2016 | Finlayson | |
| 9,828,876 B2 | 11/2017 | Kappes | |
| 10,024,191 B2 | 7/2018 | Totten et al. | |
| 2010/0077721 A1 | 4/2010 | Marshall | |
| 2012/0082541 A1 | 4/2012 | Macchia et al. | |
| 2014/0173897 A1 | 6/2014 | Alarcon | |
| 2016/0312795 A1 | 10/2016 | Crall | |
| 2017/0198716 A1 | 7/2017 | Crutchfield | |
| 2017/0234329 A1 | 8/2017 | Kray et al. | |
| 2018/0066675 A1 | 3/2018 | Kappes et al. | |
| 2018/0080339 A1 | 3/2018 | Kray et al. | |
| 2018/0230855 A1 | 8/2018 | Heeter | |
| 2018/0258796 A1 | 9/2018 | Jain et al. | |

* cited by examiner

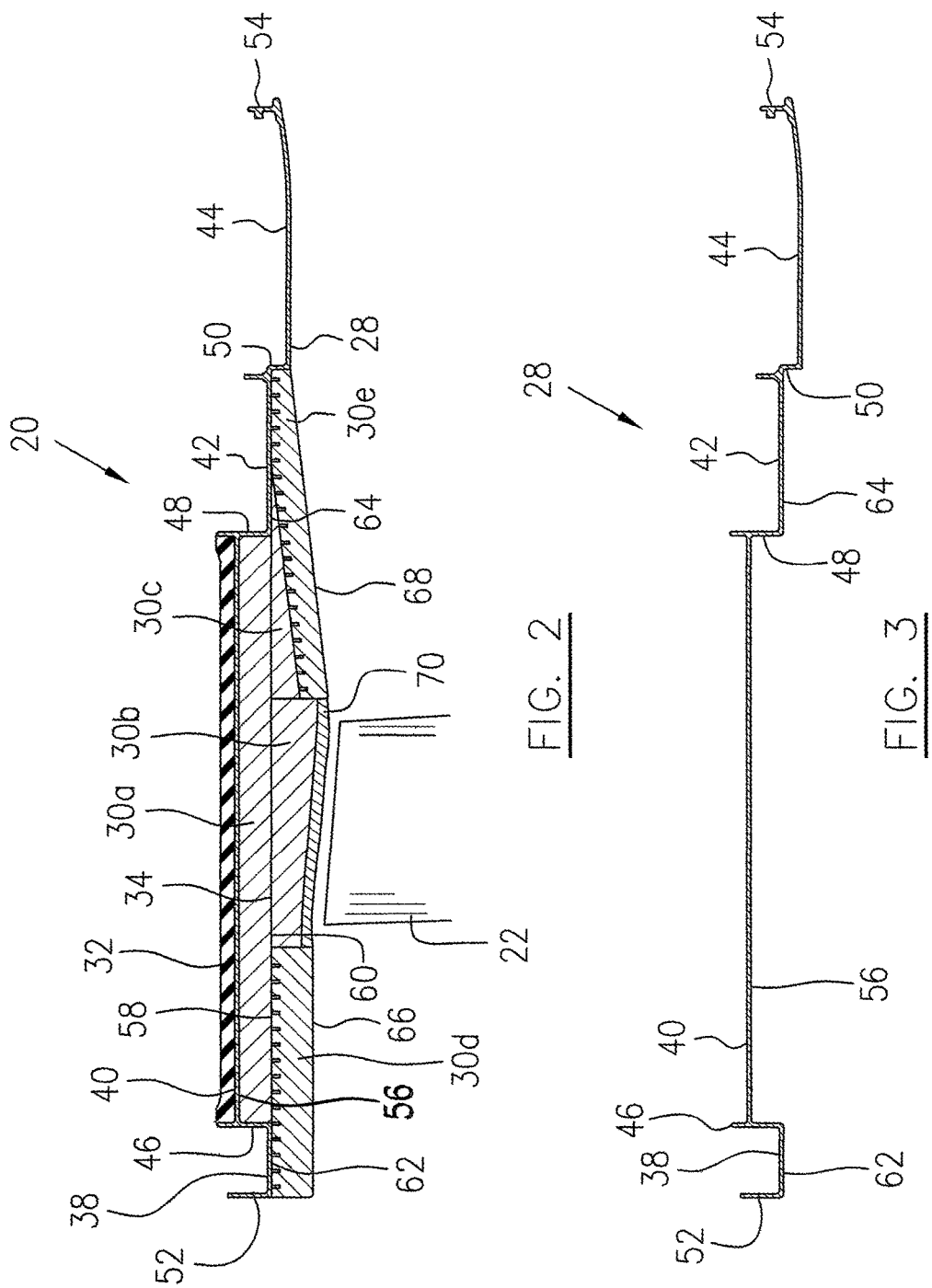

STEEL SOFT WALL FAN CASE

CROSS-REFERENCE TO RELATED APPLICATION

This application is a continuation of U.S. application Ser. No. 14/711,854 filed May 14, 2015, the entire contents of which are incorporated by reference herein.

TECHNICAL FIELD

The application relates generally to turbofan gas turbine engines and, more particularly, to a soft wall steel fan case of turbofan gas turbine engines.

BACKGROUND OF THE ART

Turbofan engines typically have a fan with a hub and a plurality of fan blades disposed for rotating about a central axis of the engine. The casing surrounding the fan blades must be able to contain a broken fan blade or blade fragments propelled outwardly from the rotating hub at high speeds during a fan blade-off (FBO) event. Conventionally, a hard wall fan case uses a metallic fan case structure to absorb the energy of the fan blade projectiles during an FBO event. The metallic fan case structure has thick walls to provide adequate strength as required. Some types of soft wall fan cases have also been developed, which allow a fan blade to partially penetrate a thin-walled fan case during an FBO event with energy absorption due to the case penetration. In such soft wall fan cases, energy is typically absorbed by a containment fabric layer, such as fabric containing para-aramid synthetic fiber known as Kevlar®, which has been wrapped around the outside of the fan case. These fan cases may be made of aluminium or other metallic or composite materials. However, it is a challenge to fabricate a soft wall fan case having thinner duct walls while meeting the required structural stiffness and strength.

Accordingly there is a need to provide an improved soft wall fan case.

SUMMARY

In one aspect, there is provided a turbine engine having a fan case surrounding a set of fan blades rotating about a central axis of a turbine engine, the fan case comprising: a steel support structure shell having a plurality of annular axial walls of sheet metal in an axial series including first, second and third annular axial walls, the second annular axial wall having a diameter greater than a diameter of the respective first and third annular axial walls, a plurality of radially extending rings including a first ring radially interconnecting the first and second annular axial walls and a second ring radially interconnecting the second and third annular axial walls; an annular metallic inner axial wall positioned within and secured to the support structure shell; honeycomb material sandwiched radially between the annular metallic inner axial wall and the second annular axial wall; and a layer of containment fabric material wrapped around a radial outer surface of the second annular axial wall.

In another aspect, there is provided a method of fabricating an annular fan case for surrounding a set of fan blades rotating about a central axis of a turbine engine, the method comprising steps of: a) fabricating a steel support structure shell of the fan case using sheet metal to produce a plurality of annular axial walls positioned in an axial series, and using a plurality of radially extending forged steel rings each to radially interconnect axially adjacent two of the annular axial walls having different diameters, the sheet metal being selected from a thickness range of between 0.02 and 0.07 inches; b) locating a layer of honeycomb material inwardly of a radial inner side of the steel support structure shell, the honeycomb material being axially restricted by the radially extending forged steel rings; c) securing an annular metallic inner axial wall to the steel support structure shell so that the layer of honeycomb material is sandwiched between the metallic annular inner axial wall and one of the annular axial walls, wherein steps (a), (b) and (c) are conducted such that all of the annular axial walls of the sheet metal, the forged steel rings, the annular metallic inner axial wall and the honeycomb material are securely connected together to form a structurally integrated thin-walled assembly with enhanced stiffness; and d) wrapping a layer of fabric containment material around a radial outer surface of said one of the annular axial walls of the steel support structure shell.

DESCRIPTION OF THE DRAWINGS

Reference is now made to the accompanying drawing in which:

FIG. 2 is a detailed schematic cross-sectional view of a portion of the fan case shown in FIG. 1; and FIG. 3 is a schematic cross-sectional view of a portion of a steel support structure shell of sheet metal, used in the fan case of FIG. 1.

It will be noted that throughout the appended drawings, like features are identified by like reference numerals.

DETAILED DESCRIPTION

Figure 1:
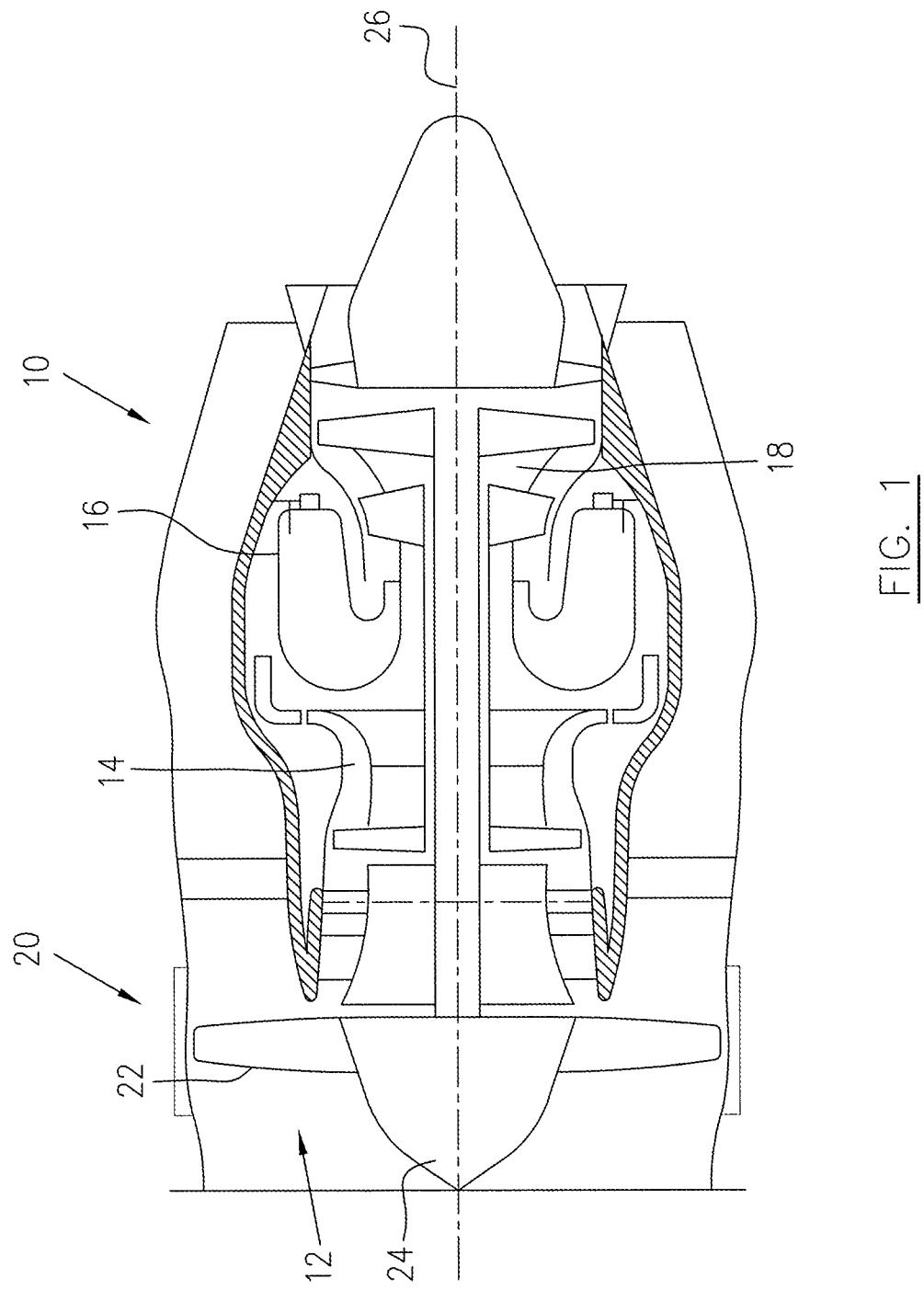
FIG. 1 is a schematic side cross-sectional view of a gas turbine engine including a fan case according to one embodiment.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases. The fan 12 includes a fan case 20 surrounding a circumferential array of fan blades 22 extending radially outwardly from a rotor 24 mounted for rotation about a central axis 26 of the engine 10.

As shown in FIGS. 2 and 3, the fan case 20 according to one embodiment may have an annular soft wall sandwich structure designed for containing blade fragments or blades during a fan blade-off (FBO) event. As will be seen hereinafter, the described embodiment allows minimizing of the outside diameter and weight of the fan case while still providing the required blade containment capability and the required structural stiffness and strength.

It should be noted that the terms "radial", "axial" and "circumferential" used throughout the description and the appended claims, are defined with respect to the central axis 26 of the engine 10. The terms "front", "forward" "afore", "aft" and "after" used throughout the description and the appended claims are defined with respect to the flow direction of air being propelled through the engine.

The fan case 20 generally includes a thin-walled steel support structure shell 28, honeycomb materials 30a, 30b, 30c, 30d and 30e which may be light weight, forming a honeycomb material layer bonded or otherwise suitably secured to a radially inner side of the thin-walled steel support structure shell 28, a thin-walled annular metallic inner axial wall 34 such as an aluminium wall, positioned within the thin-walled support structure shell and embedded in the honeycomb material layer and bonded or otherwise suitably secured to the thin-walled support structure shell 28, and an outer containment fabric layer 32 wrapped around the thin-walled steel support structure shell 28.

In the illustrated embodiment, the thin-walled steel support structure shell 28 is provided in the form of a one-piece continuous annular steel component, for example, made of sheet metal selected from a thickness range of between 0.02 and 0.07 inches. In order to improve the structural stiffness and strength of such a thin-walled shell configuration, the thin-walled steel support structure shell 28 may include a plurality of axial sections arranged in an axial series and having different diameters, and a plurality of radially extending rings 46, 48 and 50 which may be of forged steel, to radially interconnect first, second, third and fourth annular axial walls 38, 40, 42 and 44 in adjacent two axial sections, respectively. For example, the second annular axial wall 40 may have a diameter greater than a diameter of respective first and third axial walls 38, 42 which may have a diameter equal to or different one from the other, and a fourth annular axial wall 44 may have a diameter smaller than the diameter of the third annular axial wall 42.

Optionally, the radial dimension between a radial inner edge and a radial outer edge of the respective forged steel rings 46, 48 and 50 may be greater than the diameter difference between the respective adjacent two of the annular axial walls 38, 40, 42 and 44 such that the radial outer edge of the respective forged steel rings 46, 48 may project radially outwardly from the second annular axial wall 40 and the radial outer edge of the forged steel ring 50 may project radially outwardly from the third annular axial wall 42. The radially extending forged steel rings may each be formed as a flat ring such as the forged steel rings 46, 48, shown in FIG. 3. Alternatively, the axially extending forged steel rings may each be formed with a radial outer portion and a radial inner portion axially offset one from another and interconnected by a very small annular axial portion, such as the forged steel ring 50 in FIG. 3.

Optionally, the thin-walled steel support structure shell 28 may be further provided with a radially extending front forged steel ring 52 secured to and extending radially outwardly from a forward end of the first annular axial wall 38 which is also a forward end of the steel support structure shell 28 and a radially extending aft forged steel ring 54 secured to and extending radially and outwardly from an aft end of the fourth annular axial wall 44 which is also the aft end of the steel support structure shell 28. The front and aft forged steel rings 52, 54 may provide a mounting device for connecting the fan case 28 to a nacelle casing of the engine 10 and may also enhance the stiffness and strength of the fan case 20.

Optionally, the annular axial walls 38, 40, 42 and 44 may have an equal thickness (made from sheet metal having the same thickness) or may have different thicknesses (made from sheet metal having different thickness within the range between 0.02 and 0.07 inches).

An annular chamber may be formed on a radially inner circumference 56 of the second annular axial wall 40 and may axially extend between the radially extending forged steel rings 46 and 48 for receiving the honeycomb material 30a such as a filler-structure honeycomb material. "Filler-structure honeycomb material" is a honeycomb material sandwiched between two members in order to provide structural stability of the assembly compare to an empty cavity. In this case the honeycomb sandwich provides stability of the case before and after the FBO event. Before the event it provides dimensional stability of the case 20 and after the event holds the damaged shell structure together under the inward tension of the Kevlar® wrap. The blade fragments usually pass through the steel support structure shell 28 and contained by the Kevlar® wrap 32. Therefore the damaged steel support structure shell 28 is prone to collapse under the inward tension of the Kevlar®, the filler structure provides support for the Kevlar® wrap. The honeycomb material 30a may completely fill the chamber and may be sealed therein by the annular metallic inner axial wall 34. The honeycomb material 30a may extend continuously from the forged steel ring 46 to the forged steel ring 48, thereby fully axially spanning the tips of the blades 22. The honeycomb material 30a may be bonded or otherwise suitably secured to the radially inner circumference 56 of the second annular axial wall 40 and a radially outer side 58 of the annular metallic inner axial wall 34. The annular metallic inner axial wall 34 may also be bonded or otherwise secured to the first and second annular axial walls 38 and 42 or to the forged steel rings 46, 48 of the steel support structure shell 28. The thin-walled steel support structure shell 28, the honeycomb material 30a and the annular metallic inner axial wall 34 are thus structurally integrated with one another, forming a structure with the honeycomb material 30a sandwiched between the second annular axial wall 40 of sheet metal and the annular metallic inner axial wall 34. Therefore, the honeycomb material 30a not only provides for small blade fragment retention and kinetic energy absorption but also plays a structural role in contributing to stiffen/reinforce the fan case assembly in addition to the structural stiffness and strength provided by the thin-walled steel support structure shell 28 of sheet metal reinforced by the forged steel rings 46, 48, 50, 52, 54. U.S. Pat. No. 8,202,041 issued on Jun. 19, 2012 which is incorporated herein by reference, describes a structure of a honeycomb material sandwiched between metallic shells.

Optionally, further honeycomb materials 30b, 30c such as filler-structure honeycomb materials, and honeycomb materials 30d, 30e such as acoustic honeycomb materials may be added within the steel support structure shell 28 for example, and may be bonded or otherwise suitably secured to radially inner sides 62, 60 and 64 of the respective first annular axial wall 38, annular metallic inner axial wall 34 and third annular axial wall 42. The honeycomb materials 30b, 30c, 30d, and 30e may continuously extend axially from the forward end of the first annular axial wall 38 to the forged steel ring 50, in order to further provide energy absorption during an FBO event as well as to contribute to stiffen the fan case 20. The honeycomb materials 30a, 30b, 30c, 30d and 30e may be structurally integrated with the annular metallic inner axial wall 34 to form a honeycomb material layer within which the annular metallic inner axial wall 34 is embedded.

As mentioned above, the honeycomb material layer may include the acoustic honeycomb materials 30d, 30e (for instance a honeycomb foam composite material) which also provide acoustic damping. The acoustic honeycomb materials 30d and 30e may be axially positioned afore and after the blades 22, respectively, and radially inner sides 66, 68 of the respective acoustic honeycomb materials 30d, 30e may constitute part of the radially innermost surface of the fan case 20. An abradable tip clearance control layer 70 may be provided on the radially inner side of the filler-structure honeycomb material 30b such that the abradable tip clearance control layer 70 is axially positioned between the radially inner sides 66, 68 of the respective acoustic honeycomb materials 30d and 30e, and is axially aligned with the tips of the blades 22 in order to enable close clearances between the blade tips and the radially innermost surface of the fan case 20. The radially innermost surface of the fan case 20 formed by the abradable layer 70 and the radially inner sides 66, 68 of the acoustic honeycomb materials 30d, 30e therefore form an axially continuous flow boundary surface of the fan case 20 for the incoming air. U.S. Pat. No. 8,202,041 issued on Jun. 19, 2012 which is incorporated herein by reference, also describes an abradable tip clearance control layer.

The outer containment fabric layer 32 wrapped around the second annular axial wall 40 may extend axially between the forged steel rings 46 and 48 and may be constructed of aromatic polyamide fabric such as Kevlar®, which has a relatively light weight and high strength. Other light-strength woven fibrous materials (e.g. ballistic type fabrics) could be used as well. Any suitable reinforcing fibres can be used to form the outer blade containment ring, including but not limited to, glass fibers, graphite fibers, carbon fibers, ceramic fibers, etc. U.S. Pat. No. 8,202,041 issue on Jun. 19, 2012 which is incorporated herein by reference, describes such fabric materials.

The foregoing has described a soft wall fan case for a gas turbine engine which combines the functions of blade containment and noise suppression. The fan case has a steel support structure shell of thin sheet metal having a thickness in a range between 0.02 and 0.07 inches, for example. The thin-walled steel structure support shell is stiffened and reinforced by a plurality of rings which may be of forged steel, interconnecting adjacent annular axial walls having different diameters. A layer of honeycomb materials may be secured within and integrated with the thin-walled steel structure support shell (secured to both the first, second, third axial walls and the first, second, third forged steel rings) such that an annular metallic steel wall secured to the steel structure support shell is embedded in the layer of honeycomb materials and at least a part of the honeycomb materials may be sandwiched between the annular metallic inner axial wall and one of the annular axial walls of the steel structure support shell. Such an integrated fan case assembly with the fabric containment layer wrapped around the outside of the steel structure support shell as described and illustrated in the above-embodiment is relatively light weight and compact, while providing a cost effective blade containment system and good acoustic damping structure over conventional hard wall and soft wall fan case designs.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A turbine engine having a fan case surrounding a set of fan blades rotating about a central axis of a turbine engine, the fan case comprising:
   a steel support structure shell having a plurality of annular axial walls of sheet metal in an axial series including first, second and third annular axial walls, the second annular axial wall having a diameter greater than a diameter of the respective first and third annular axial walls, a plurality of radially extending rings including a first ring radially interconnecting the first and second annular axial walls and a second ring radially interconnecting the second and third annular axial walls;
   an annular metallic inner axial wall positioned within and secured to the support structure shell;
   honeycomb material sandwiched radially between the annular metallic inner axial wall and the second annular axial wall; and
   a layer of containment fabric material wrapped around a radial outer surface of the second annular axial wall.

2. The turbine engine as defined in claim 1 wherein a radial outer edge of the respective first and second rings projects radially outwardly from the second annular axial wall.

3. The turbine engine as defined in claim 1 wherein the annular metallic inner axial wall is aluminium.

4. The turbine engine as defined in claim 1 further comprising additional honeycomb material secured to a radially inner side of the annular metallic inner axial wall, and wherein the honeycomb material and the additional honeycomb material comprises filler-structure honeycomb materials and acoustic honeycomb materials.

5. The turbine engine as defined in claim 4 wherein the acoustic honeycomb materials are positioned axially afore and after the fan blades, respectively, forming part of a radially innermost surface of the fan case.

6. The turbine engine as defined in claim 5 wherein the fan case further comprises an abradable tip clearance control layer on a radially inner side of the filler-structure honeycomb and positioned axially between the acoustic materials.

7. The turbine engine as defined in claim 1 wherein the support structure shell further comprises a fourth annular axial wall of sheet metal having a diameter smaller than the diameter of the third annular axial wall, and wherein the plurality of radially extending rings further comprises a third ring radially interconnecting the third and fourth annular axial walls.

8. The turbine engine as defined in claim 7 wherein the plurality of radially extending rings further comprises a front ring extending radially outwardly from a forward end of the first annular axial wall and an aft ring extending radially and outwardly from an aft end of the fourth annular axial wall.

9. The turbine engine as defined in claim 7 wherein a radial outer edge of the third ring projects radially outwardly from the third annular axial wall.

10. The turbine engine as defined in claim 7 wherein the honeycomb material is axially restricted by the first, second and third rings.

11. The turbine engine as defined in claim 1 wherein the plurality of annular axial walls of the steel support structure have an equal thickness.

12. The turbine engine as defined in claim 1 wherein the plurality of annular axial walls of the steel support structure have a thickness in a range between 0.02 and 0.07 inches.

13. The turbine engine as defined in claim 1 wherein the plurality of radially extending rings are forged steel rings.

14. A method of fabricating an annular fan case for surrounding a set of fan blades rotating about a central axis of a turbine engine, the method comprising steps of:
   a) fabricating a steel support structure shell of the fan case using sheet metal to produce a plurality of annular axial walls positioned in an axial series, and using a plurality of radially extending forged steel rings each to radially interconnect axially adjacent two of the annular axial walls having different diameters, the sheet metal being selected from a thickness range of between 0.02 and 0.07 inches;

b) locating a layer of honeycomb material inwardly of a radial inner side of the steel support structure shell, the honeycomb material being axially restricted by the radially extending forged steel rings;

c) securing an annular metallic inner axial wall to the steel support structure shell so that the layer of honeycomb material is sandwiched between the metallic annular inner axial wall and one of the annular axial walls, wherein steps (a), (b) and (c) are conducted such that all of the annular axial walls of the sheet metal, the forged steel rings, the annular metallic inner axial wall and the honeycomb material are securely connected together to form a structurally integrated thin-walled assembly with enhanced stiffness; and d) wrapping a layer of fabric containment material around a radial outer surface of said one of the annular axial walls of the steel support structure shell.

15. The method as defined in claim 14 wherein the radially extending forged steel rings are secured to the steel support structure shell such that a radial outer edge of each forged steel ring projects radially outwardly from the steel support structure shell.

16. The method as defined in claim 14 wherein step (a) comprises securing additional forged steel rings to axially opposed forward and aft ends of the steel support structure shell, respectively, such that the additional forged steel rings extend radially outwardly from the respective forward and aft ends of the steel support structure shell.

17. The method as defined in claim 14 wherein the plurality of annular axial walls made of sheet metal have an equal thickness.

18. The method as defined in claim 14 comprising selecting the layer of fabric containment material from high-strength fibrous fabric including para-aramid synthetic fiber.

19. The method as defined in claim 14 further comprising securing additional honeycomb material to a radially inner side of the annular metallic inner axial wall such that the annular metallic inner axial wall is embedded between the layer of honeycomb material and the additional honeycomb material.

* * * * *